United States Patent [19]

Mackenzie

[11] 4,334,658
[45] Jun. 15, 1982

[54] STALLING AERODYNAMICS OF THE CESSNA MODELS 150 AND 152 SERIES AIRCRAFT

[76] Inventor: Sprague B. Mackenzie, 3847 Bassett Rd., Rootstown, Ohio 44272

[21] Appl. No.: 27,812

[22] Filed: Apr. 6, 1979

[51] Int. Cl.³ .......................... B64C 3/58; B64C 21/10
[52] U.S. Cl. .................................... 244/198; 244/213; 244/200; 244/130
[58] Field of Search ............... 244/198, 199, 200, 205, 244/130, 213, 53 B, 212, 214, 1 R, 129.1, 134 C, 134 D; 343/705, 708; 416/224

[56] References Cited

U.S. PATENT DOCUMENTS

| | | | |
|---|---|---|---|
| 1,769,393 | 7/1930 | Rydberg | 244/134 C |
| 1,831,780 | 11/1931 | Sharp | 244/198 |
| 2,037,626 | 4/1936 | Hall | 244/214 |
| 2,503,585 | 4/1950 | Loedding | 244/214 |
| 2,638,286 | 5/1953 | Mathisen | 244/1 R |
| 2,800,291 | 7/1957 | Stephens | 244/200 |
| 3,463,418 | 8/1969 | Miksel | 244/199 |
| 4,032,087 | 6/1977 | Cleaver | 244/214 |

FOREIGN PATENT DOCUMENTS 446094 4/1936 United Kingdom .

*Primary Examiner*—Galen L. Barefoot
*Attorney, Agent, or Firm*—Oldham, Oldham, Hudak & Weber Co.

[57] ABSTRACT

A pair of metallic strips are provided for the improvement in the stalling aerodynamics of the Cessna Series 150 and 152 aircraft, especially during conditions which would otherwise generate an unintentional spin entry, followed by a fatal accident. The strips are secured to the leading edge of the airplane wing at a point substantially adjacent to each wing root. Each strip has a plurality of raised surfaces for modifying the airflow over the upper wing surface, and a concave surface which is placed against the leading edge of the airplane wing. Fasteners placed in recessed areas on the strip secure the strip to the wing's leading edge. The addition of these strips to the airplane wing modify the stall pattern in its area of separated airflow over the upper surface of the wing in such a way that the pilot is provided with greater aileron control during stalling conditions.

6 Claims, 4 Drawing Figures

STALLING AERODYNAMICS OF THE CESSNA MODELS 150 AND 152 SERIES AIRCRAFT

BACKGROUND OF THE INVENTION

This invention relates to the improvement in the stalling aerodynamics of the Cessna Models 150 and 152 series aircraft by the assembly of stall strips on the leading edges of the wings adjacent to the wing roots of these aircraft. The proper size and location of these strips were determined through flight testing to obtain the desired results for the particular series of light aircraft.

While the requirements of all flight instruction include the techniques for recovery from stalls and spins, the incidence of accidents caused by stalls and spins is a source for concern with Government agencies such as the Federal Aviation Agency and the National Transportation Safety Board. The stall/spin accident statistics accumulated by the Federal Aviation Administration and the National Transportation Safety Board on the Cessna 150 and 152 indicate that an improvement to the basic aircraft is needed. A published table derived from the 1977 FAA "Analysis of Selected General Aviation Stall-Spin Accidents" ranks the Cessna 150 fourth in the number of stall/spin accidents per 1,000 aircraft out of a group of thirty-six different aircraft. The National Transportation Safety Board has stated that the Cessna 150 has a "very high" stall/spin frequency and their recommendations have called for "modification kits aimed at improving the handling characteristics of present aircraft" (Reference NTSB-AAS-72-8, "Special Study, General Aviation Stall/Spin Accidents" adopted Sept. 13, 1972). The Cessna 150/152 series aircraft has been produced for over twenty years without successful improvement in handling characteristics to overcome the inherent aerodynamic difficulties in a stall/spin condition. Therefore, the need exists for a modification to the airplane wings of the Cessna 150 and 152 which minimizes the dangers of loss of control from stall or spin when the flying conditions would otherwise so generate the same.

An aircraft is in a stalled condition when the airflow passing over the upper wing surface is no longer flowing smoothly, but has become separated or detached from the wing's surface. This occurs at a given angle of attack of the wing section relative to the wing's flight path. That portion of the wing which has separated airflow is no longer producing lift. This occurs at the lowest speed capability of the aircraft with the aircraft under a normal one gravity acceleration, i.e. the stall speed.

Heretofore, since the point at which the stall occurs is dependent on the angle of attack for a given airfoil section, it has been the normal design practice to put a twist in the wing. This is done so that the wing tip is flying at a lower angle of attack than the wing root. Thus, the stall (separated airflow) will originate at the wing root and progress towards the wingtip. A wing without wing twist could stall simultaneously along the whole wing panel and the aircraft could easily roll off into spin entry because the ailerons for controlling the roll have also stalled. Thus, it has been a normal design practice to build a 2½ to 3 degree twist in the wing at the time of the wing's manufacture on most general aviation aircraft to provide for an acceptable stall progression on the wing.

The Cessna Models 150 and 152 have only a one degree twist in the wing, with the wing tip flying at an angle of attack of one degree less than the wing root. Since the point at which the stall occurs is dependent on the angle of attack, the outer wing panel, having the ailerons, is not sufficiently protected from stalling when the wing root stalls. Pilots who place the aircraft in a yaw by improperly using the rudder pedals and the opposite aileron to pick up the falling wing, otherwise known as cross controlling, can cause one whole wing panel, that which has the downward deflected aileron and pro-spin rudder, to stall out when the stall occurs. If this happens, the aircraft will roll off into a spin entry. Therefore, a modification, in addition to wing twist, is necessary for Cessna Models 150 and 152 series aircraft which provide acceptable stall characteristics to satisfy the recommendation of the National Transportation Safety Board.

OBJECTS OF THE INVENTION

Consequently, it is an object of the invention to provide an improvement to the stall pattern on the wing of the Cessna 150/152 series aircraft airplane wings to provide an improvement to the stall characteristics.

Another object of the invention is to provide an improvement to the aerodynamics of these airplane wings, as above, whereby a strip is secured to the leading edge of each wing near the wing root.

Yet another object of the invention is to provide the improvement to the aerodynamics of these airplane wings, as above, wherein the strip has raised surfaces which meet at an angle which further refines the leading edge angle, to modify the separated air flow conditions of a stall over the wing.

Still another object of the invention is to provide an improvement to the aerodynamics of Cessna 150/152 series airplane wings, as above, wherein the strip is contoured to provide adequate contact with the leading edge of the airplane wing.

Still another object of the invention is to provide an improvement to the aerodynamics of Cessna 150/152 series airplane wings, wherein the strip is placed on a partial portion of the leading edge of each wing, the securement thereto not otherwise effecting the aerodynamic properties of the wing during conventional flight.

These and other objects of the invention which will become more apparent as the detailed description of the preferred embodiment proceeds, are achieved by: an improvement to the stalling aerodynamics and stall characteristics of Cessna 150/152 series aircraft having a fuselage and two wings having leading edges, wing tips and wing roots, wherein the improvement comprises: the securement of a strip on a portion of the leading edge of each wing substantially adjacent to each wing root to trigger the separation of the air flow against the wing at the wing root; said strip having two termini, a plurality of raised surfaces, a contour surface, and a plurality of recesses having securement orifices; two said raised surfaces intersecting at a raised surface junction, said raised surface junction having an angle; and said contour surface intersecting two said raised surfaces at raised-contour surface junctions communicating with said leading edge of said wing, whereby said securement of said strip on each said wing minimizes the incidence of unintentional roll into spin entry by forcing the wing root to stall prior to the wing tip.

DESCRIPTION OF THE DRAWINGS

For an understanding of the structure and function of the invention, reference is had to the following drawings, upon which numbers have been placed to correspond with items of structure detailed in the specification.

DETAILED DESCRIPTION OF THE PREFERRED EMBODIMENTS

Figure 1:
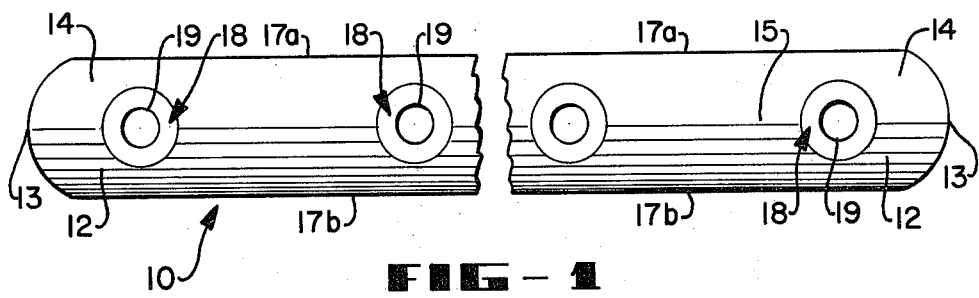
FIG. 1 is a top view of the stall strip.
Figure 2:
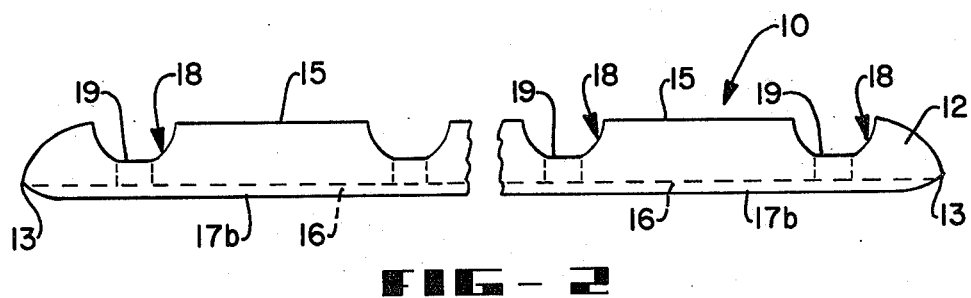
FIG. 2 is a side view of the stall strip.
Figure 3:
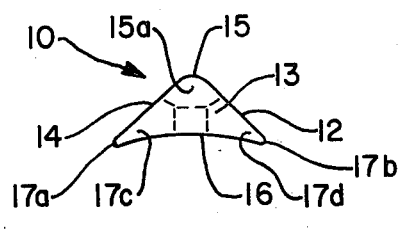
FIG. 3 is an end view of the stall strip.

For an understanding of the structure of the improvement strip, reference is made to FIGS. 1, 2 and 3 as described hereinabove. The stall strip, generally denominated as 10 in these figures, has a plurality of surfaces which are exposed to the aerodynamic forces which would otherwise be communicating with the leading edge of the airplane wing. In this instance, there is a lower raised surface 12 and an upper raised surface 14, the lower and upper denominations expressed merely for the relationship of the strip 10 as assembled on the leading edge to be seen in FIG. 2. The lower raised surface 12 and upper raised surface 14 intersect one another at raised surfaces junction 15, in this case extending across the center line of the strip at its uppermost point.

The third surface of strip 10 in this embodiment is contour surface 16 which is shaped to provide sufficient contact with the leading edge of the airplane wing after assemblage. The shape of the contour may be seen by examining FIG. 3. Both upper raised surface 14 and lower raised surface 12 intersect the contour surface 16 at raised-contour surface junctions 17a and 17b, extending along the longitudinal perimeters of the strip 10.

At several places along the raised surfaces 12 and 14, exist recesses 18 through which orifices 19 extend. The recesses 18, as best seen in FIG. 2, provide a counterbored area into which the fasteners may reside. The desired diameter of orifices 19 depends upon the diameter of the fastener to be used. The head of the fastener should be placed within the recesses 18. The number and shape of the recesses depend upon the particular installation and type of fastener used.

At both ends of strip 10 reside termini 13. Each terminus 13 has a curved shape to accommodate the combined intersection of the raised surfaces 12 and 14, the contour surface 16, and the three junctions 15, 17a and 17b. The particular shape of each terminus 13 may be varied according to the dimensions of each of the above elements and is not critical, but the particular shape in this embodiment may be perceived by examination of FIGS. 1 and 2.

The strip 10 should be of sufficient length to provide the aerodynamic properties desired. However, the desirable length of such a strip on a light single-engine airplane is approximately 10 to 25 inches. Preferably, the strip 10 for a Cessna 150/152 series aircraft is approximately 20 inches long. That length provides the optimum aerodynamic improvement in roll control for the Cessna 150/152 series aircraft without interrupting the other aerodynamic properties necessary for sustained flight.

The angles of junctions 15, 17a and 17b may vary according to the surface dimensions of surfaces 12, 14 and 16. Upper raised surface 14 and lower raised surface 12 have substantially similar dimensions, and contour surface 16 is a modified form of the hypotenuse of the overall triangular shape. The overall height of strip 10 as it extends from junctions 17-17a to junction 15 is approximately from about 0.20 inches to about 0.30 inches. Preferably, the extension of the leading edge of the wing using strip 10 is about 0.250 inches. As a result of these various dimensions of the surfaces 12, 14 and 16 and their relationship, it may be seen that at junction 15 the strip 10 has an angle designated by numeral 15a substantially from about 80° to about 100°, and that at each junction 17a and 17b and strip 10 defines angles 17c and 17d from about 35° to about 55°. Preferably, for Cessna 150/152 series aircraft, angle 15a is approximately 90°, and angles 17c and 17d are approximately 45° (assuming the contour of contour surface 16 to be non-existent).

The strip 10 may be made from any material which is sturdy but lightweight. Materials otherwise used in the aircraft art for aerodynamic purposes may be formed according to the dimensions of the strip 10. Desirably, the material may be a lightweight, but sturdy metal such as titanium or magnesium. Preferably, the material is anodized aluminum.

Because the strip is a modification of the leading edge angle on the airplane wing, the number of raised surfaces and raised surface junctions may vary according to the requirements of each airplane wing geometry. Therefore, a plurality of raised surfaces performing the same aerodynamic functions may be utilized without departing from the scope of this invention.

Figure 4:
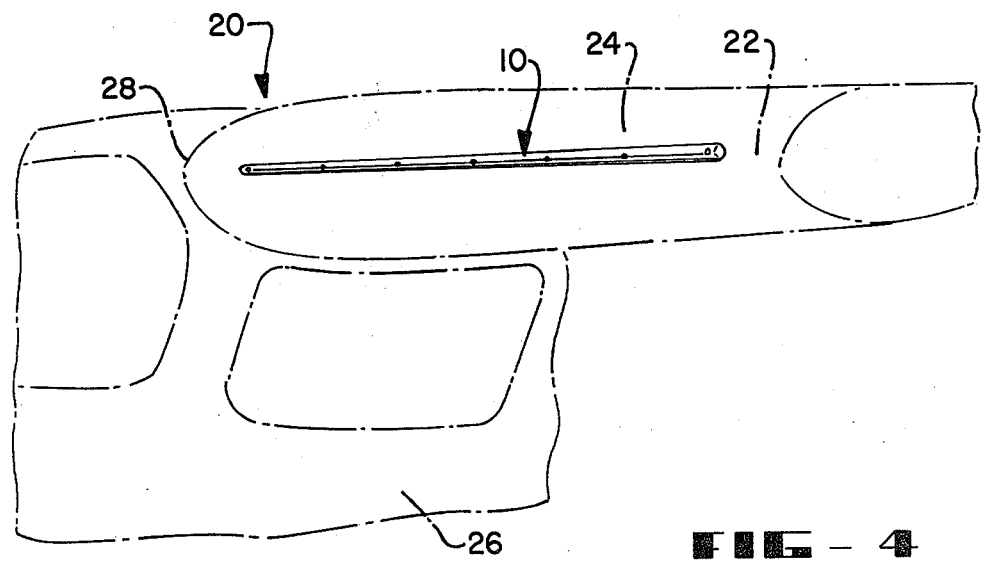
FIG. 4 is a diagrammatic view of the placement of the stall strip on the airplane.

Referring now to FIG. 4, an understanding of the securement of strip 10 to the airplane 20 may be seen and understood. The airplane 20, as shown in this case as a light single-engine airplane, has elevated airplane wings 22 and a fuselage 26. On the foremost surface of each airplane wing 22 is a leading edge 24. The leading edge 24 is generally rounded according to conventional requirements for this design of airplane, the remainder of the wing being formed to provide the sufficient lift according to aerodynamic requirements. At the junction of the wing 22 to the fuselage 26 is wing root 28. The position of strip 10 along wing 22 occurs on leading edge 24 substantially adjacent to wing root 28.

Strip 10 is secured by fasteners, known to those skilled in the art, passing through recesses 18 and orifices 19 into the leading edge 24. Typically, the fasteners may be rivets or other methods to secure two materials where access through the second material is not available.

The location of strip 10 on leading edge 24 is designated to achieve the most significant improvement in the desired aerodynamic properties. The strip 10 is placed at the leading edge 24 where the extension of strip 10 from leading edge 24 is above the stagnation point (the point of airflow separation at the wing's leading edge) at the stall without otherwise deleteriously affecting the stall speed or other flight characteristics. For the Cessna 150/152 series aircraft, the strip 10 is placed at the leading edge 24 where the curvature of the same extends the farthest forward (i.e. the centerline of the leading edge). In this position, on Cessna 150/152 series aircraft, the stall speed is increased by only approximately one knot calibrated airspeed. That is to say, the strip 10 provides a means of triggering the wing root to stall slightly earlier to minimize the incidence of unintentional roll and spin entry by controlling the stall pattern on the wing panel. The length of strip 10, as described hereinabove, at this position on leading edge 24, is sufficient to force the wing root 28 to stall slightly earlier than without the strips 10. By such precipitated stall characteristics at wing root 28, the ailerons remain unstalled longer and effectively provide more roll control to the pilot during the uncoordinated stall.

Strip 10 is located substantially adjacent to the wing root 28 on the leading edge 24. For the Cessna 140/152 series aircraft, terminus 13 is approximately four inches from wing root 28. It is at this horizontal and vertical placement where the narrowed leading edge angle as caused by strip 10 is most crucial. Placement at other locations can result in the stall strips not being effective in controlling the stall pattern, or result in raising the stall speed by as much as eight knots or more. The stall strips so located as described above permit the other maneuvering apparatus of the airplane including ailerons and rudder to maintain aerodynamic control longer as described above when the stalling speed would otherwise generate an uncontrollable roll-off into a spin entry if uncoordinated use of ailerons and rudder are used.

While the placement of strip 10 on airplane 20 is designed to minimize uncoordinated stalls and spins, such characteristics are also predictable for contorted maneuvers of the aircraft. Violent maneuvering of the aircraft at various speeds such as accelerated stalls, yielding greater than normal gravitational forces just prior to the stall, have improved stall characteristics from the effects of strip 10 as it has been secured to the leading edge 24 of the airplane wing 22.

While a detailed description of the preferred embodiment has been provided, for Cessna 150/152 series aircraft, it is to be understood that the invention is not limited thereto or thereby. Consequently, for an understanding of the scope of the invention, reference is had to the following claims.

What is claimed is:

1. An improvement to the stalling aerodynamics and stall characteristics of Cessna 150/152 series aircraft having a fuselage and two wings having a span, leading edges, wing tips and wing roots, the leading edge of each wing having a centerline, wherein the improvement comprises:

the fixed securement of an immovable, non-pivoting, rigid strip, on substantially the centerline of the leading edge of each wing, on that portion of each said wing substantially adjacent to each wing root to passively trigger the separation of air flow against the wing at the wing root;

said strip of unchanging triangular shape having two termini defining a length thereinbetween, two substantially even raised surfaces, a contour surface and a plurality of recesses having securement orifices;

said substantially even raised surfaces of said strip intersecting at a permanently determined raised surface junction, said raised surface junction having an angle substantially from about 80° to about 100°; and said contour surface intersecting both said raised surfaces of said strip at raised-contour surface junctions having an angle substantially from about 35° to about 55°, said contour surface and said raised-contour surface junctions fixedly secured to a small chordwise portion of said leading edge of said wing about said centerline, said strip immovably extending the leading edge of the wing into the airflow over a portion of the wing within four feet of the wing root, whereby said immovable, non-pivoting securement of said strip on substantially the centerline of the narrow chordwise portion of each said wing at a distance within four feet of said wing root minimizes the incidence of unintentional roll into spin entry by forcing the wing root to stall prior to the wing tip without affecting the handling properties and the normal aerodynamic properties of the aircraft at a speed above stall speed for the aircraft.

2. An improvement to the aerodynamics of airplane wings, according to claim 1, wherein said strip is made from a sturdy, lightweight material.

3. An improvement to the aerodynamics of airplane wings, according to claim 2, wherein said strip is made from aluminum.

4. An improvement to the aerodynamics of airplane wings, according to claim 1, wherein the wing root of the wing is approximately four inches to the closest point of said securement of said strip with said leading edge.

5. An improvement to the aerodynamics of airplane wings, according to claim 1, wherein the distance between the two said termini is substantially from about 10 to about 25 inches.

6. A method to minimize the incidence of unintentional roll into spin entry resulting from stalled conditions over the entire surface of the wing of Cessna 150/152 series aircraft having wing roots and wing tips, comprising the steps of:

identifying the location above the stagnation point at substantially the centerline of the leading edge of each wing of the aircraft at the desired stalling angle of attack; and fixedly securing an immovable, non-pivoting, rigid strip to substantially the centerline of said leading edge on a portion of each said wing substantially adjacent to each wing root, said strip of unchanging triangular shape having two termini, two substantially even raised surfaces, a contour surface, and a plurality of recesses having securement orifices;

two said substantially even raised surfaces of said strip intersecting at a permanently determined raised junction, said raised surface junction having an angle substantially from about 80° to about 100°; and said contour surface intersecting both said raised surfaces of said strip at raised-contour surface junctions having an angle substantially from about 35° to about 55°, said contour surface and said raised-contour surface junctions fixedly secured to a small chordwise portion of said leading edge of said wing about said centerline, said strip immovably extending the leading edge of the wing into the air flow over a portion of the wing within four feet of the wing root, whereby said immovable, non-pivoting securement of said strip on substantially the centerline of the narrow chordwise portion of each said wing at a distance within four feet of said wing root minimizes the incidence of unintentional roll into spin entry by forcing the wing root to stall prior to the wing tip without affecting the handling and the normal aerodynamic properties of the aircraft at a speed above stall speed for the aircraft.

* * * * *